UNITED STATES PATENT OFFICE.

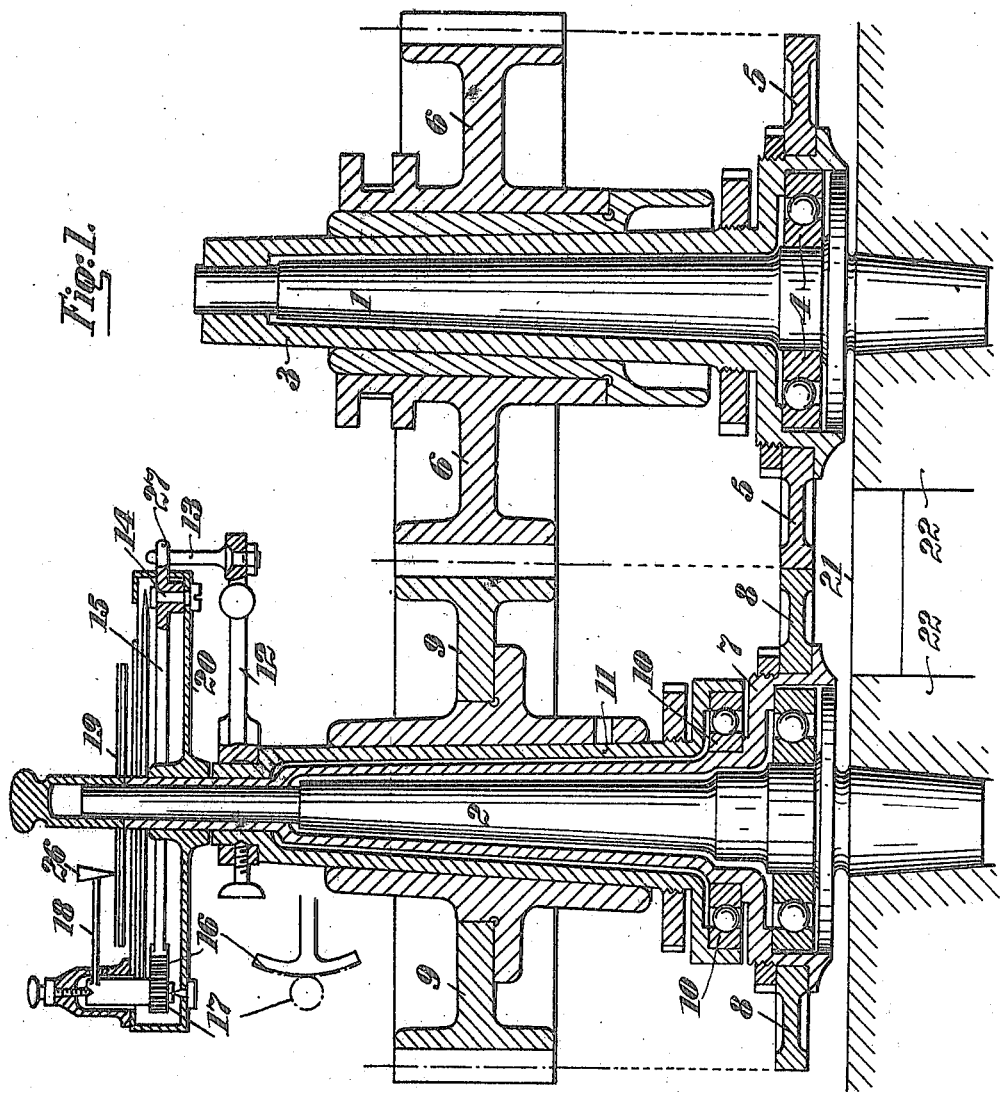

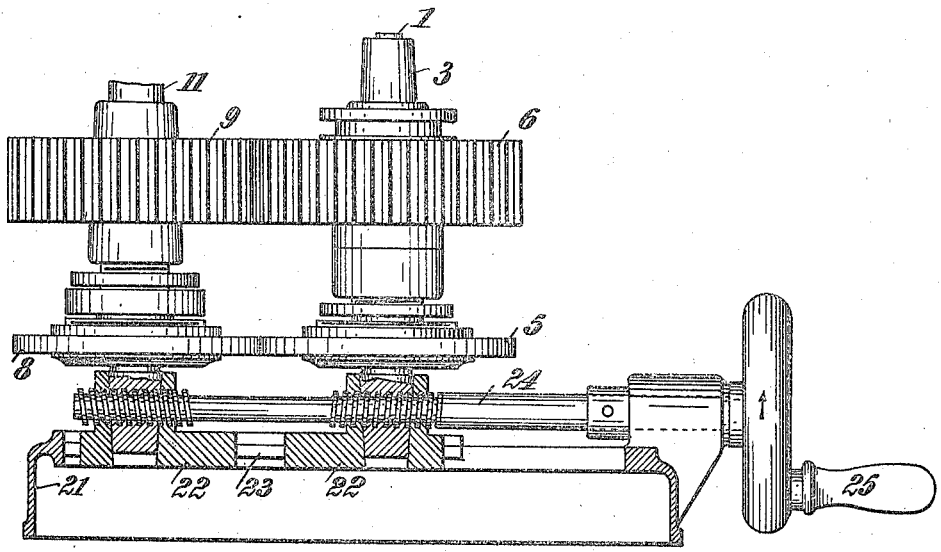
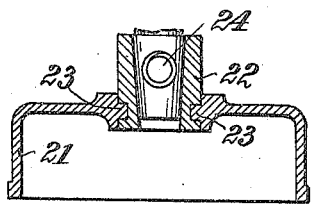

HIPPOLYT SAURER, OF ARBON, SWITZERLAND.

APPARATUS FOR TESTING THE TEETH OF GEAR-WHEELS.

1,263,472.     Specification of Letters Patent.    Patented Apr. 23, 1918.

Application filed June 12, 1915. Serial No. 33,706.

*To all whom it may concern:*

Be it known that I, HIPPOLYT SAURER, a citizen of Switzerland, residing at Arbon, Switzerland, have invented new and useful Improvements in Apparatus for Testing the Teeth of Gear-Wheels, of which the following is a specification.

My invention relates to improvements in apparatus for testing the teeth of gear wheels. The object of the improvements is to provide an apparatus whereby the inaccuracies of the working faces of the teeth of engaging gear wheels are indicated. With this object in view my invention consists in providing a pair of disks, such for example as friction disks, which are in correct driving engagement, and the diameters of which correspond to the diameters of the pitch lines of the gear wheels to be tested, and which are made to rotate together with the gear wheels, one of the said disks being rigidly connected with the corresponding gear wheel, while the other one is loosely mounted relatively to the gear wheel corresponding thereto, so that any inaccuracy in the relative movement of the gear wheels is indicated by a relative displacement of the loosely mounted disk relatively to its gear wheel, because the loosely mounted disk which is in correct engagement with the coöperating disk must necessarily perform correct movements. The relative displacements of the loosely mounted friction disk and the corresponding gear wheel indicate the inaccuracies in the engagement of the gear wheels and of the working faces of the teeth of the gear wheels.

For the purpose of explaining the invention an example embodying the same has been shown in the accompanying drawing, in which Figure 1 is a vertical cross-section of the apparatus with a pair of gear wheels mounted thereon. Fig. 2 is a side elevation partly in section, the recording mechanism being omitted, and Fig. 3 is a detail sectional view of the spindle bearing.

In the example shown in the drawing, my improved apparatus consists of a pair of spindles 1 and 2 which are mounted on a common frame or bed 21 so as to be shiftable relatively to each other. As shown the spindle 2 is fixed to the frame or bed, and the spindle 1 is secured to a slide 22 which is shiftable in a suitable guide way 23 formed on the bed, and is adapted to be shifted toward and away from the stationary spindle 2 by means of a screw-threaded spindle 24 having a crank 25 secured thereto.

On the spindle 1 a sleeve 3 is mounted for rotation a ball bearing 4 being interposed between the said parts, and to the said sleeve a friction disk 5 can be secured the diameter of which is equal to the diameter of the pitch line of one of the gear wheels 6 to be tested. The gear wheel is adapted to be rigidly secured to the sleeve by suitable means, so that the gear wheel and the friction disk when rotated move in unison. On the spindle 2 a sleeve 7 is mounted for rotation, which provides a support for a friction disk 8 the diameter of which corresponds to the diameter of the pitch line of the second gear wheel 9 to be tested. On the outer side of the sleeve 7 a second sleeve 11 is mounted, and preferably a ball bearing 10 is interposed between the said sleeves, both sleeves being free to move independently of each other. The outer sleeve 11 provides a support for the second one 9 of the coöperating gear wheels to be tested, which when secured to the said sleeve is in driving engagement with the gear wheel 6.

To the upper end of the sleeve 7 a casing 20 is secured which takes part in the rotation of the sleeve. On a pivot bolt 14 secured within the casing an arm 15 has a rocking support which is formed at its end with a segment 16 provided with gear teeth. The latter are in mesh with the teeth of a gear wheel 17 which is mounted for rotation within the casing 20 and is rigidly connected with an arm 18 carrying at its end a stylus 26 adapted to trace indications on a disk 19 which as shown is secured to the fixed spindle 2. To the upper end of the sleeve 11 an arm 12 is keyed which is provided at its outer end with a finger 13 engaging in the bifurcated end of a part 27 of the arm 15 which projects through a slot made in the wall of the casing 20.

The operation of the apparatus is as follows: The gear wheels 6 and 9 to be tested and the corresponding friction disks 5 and 8 are secured respectively to the sleeves 3, 7, and 11, as has been shown in the figure. Thereupon the slide 22 which carries the spindle 1 is shifted by means of the screw-threaded spindle 24, until the gear wheels 6 and 9 and the friction disks 5 and 8 are in driving engagement with each other. Now the gear wheel 6 and the friction disk 5 are slowly rotated by hand. The gear wheel 9 is carried along by the gear wheel 6, and the friction disk 8 is carried along by its frictional engagement with the disk 5. As long as the working faces of the teeth of the gear wheels are correct the rotary movement of the gear wheel 9 and the friction disk 8 are exactly alike, there is no relative displacement of the sleeves 7 and 11. Therefore the stylus draws a circle on the disk 19. But if the said working faces are incorrect, non-uniform movements are imparted to the gear wheel 9 and the friction disk 8, and to the sleeves 7 and 11, because to the friction disk the correct movement is imparted by the friction disk 5, while the gear wheel 9 is either advanced relatively to the friction disk 8 or lags behind the same. Therefore also the arm 12 and the casing 20 perform a slight relative rotary movement, so that the arm 15 is slightly rocked and rotates the gear wheel 17 carrying the stylus 26. The displacement of the stylus is recorded on an enlarged scale on the disk 19.

In describing the invention reference has been made to an example in which the friction disks are mounted concentrically of the corresponding gear wheels. While I prefer this construction by reason of its simplicity and the exact operation, I wish it to be understood that my invention is not limited to this feature, and that various changes may be made in the general arrangement of the apparatus and the construction of its parts within the gist of my invention.

I claim herein as my invention:

1. In an apparatus for testing pairs of gear wheels, the combination with a pair of supports for said gear wheels for rotation thereof in engagement with each other, of a pair of friction disks the diameters of which are of the same ratio as the diameters of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

2. In an apparatus for testing pairs of gear wheels, the combination with a pair of supports for said gear wheels for rotation thereof in engagement with each other, of a pair of friction disks the diameters of which are at the same ratio as the diameters of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

3. In an apparatus for testing pairs of gear wheels, the combination with a pair of supports for said gear wheels for rotation thereof in engagement with each other, of a pair of friction disks the diameters of which are respectively the same as those of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

4. In an apparatus for testing pairs of gear wheels, the combination with a pair of supports for said gear wheels for rotation thereof in engagement with each other, of a pair of friction disks the diameters of which are respectively the same as those of the pitch lines of the gear wheels and in correct driving engagement with each other and mounted respectively coaxially of the corresponding gear wheels and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

5. In an apparatus for testing pairs of gear wheels, the combination with a pair of supports for said gear wheels for rotation thereof in engagement with each other, of a pair of disks the diameters of which are of the same ratio as the diameters of the pitch lines of the gear wheels and adapted for correct driving engagement with each other and one connected with one of the gear wheels for rotation in harmony therewith and the other one loose relatively to the other gear wheel, means to shift said gear wheels and disks in engagement with each other, and means to ascertain the relative displacements of the disk and gear wheel which are loosely mounted relatively to each other.

6. In an apparatus for testing pairs of gear wheels, the combination with a pair of supports for said gear wheels for rotation thereof in engagement with each other, of a pair of friction disks the diameters of which are of the same ratio as the diameters of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

7. In an apparatus for testing the working faces of pairs of gear wheels, the combination with a pair of rotary members, and a sleeve rotatably mounted concentrically of one of said members, the other of said rotary members and the sleeve being adapted to have the gear wheels to be tested secured thereto in position for engagement with each other, of a pair of friction disks the diameters of which correspond respectively to the diameters of the pitch lines of the gear wheels and secured respectively to the rotary supports concentrically respectively of the corresponding gear wheels, and means to ascertain the relative displacements of the gear wheel which is mounted on the sleeve and the friction disk which is mounted on the concentric rotary member.

8. In an apparatus for testing the working faces of pairs of gear wheels, the combination with a pair of rotary members, and a sleeve rotatably mounted concentrically of one of said members, the other of said rotary members and the sleeve being adapted to have the gear wheels to be tested secured thereto in position for engagement with each other, of a pair of friction disks the diameters of which correspond respectively to the diameters of the pitch lines of the gear wheels and secured respectively to the rotary supports concentrically respectively of the corresponding gear wheels, a casing and an operating arm taking part respectively in the rotation of the sleeve and the support which is concentric thereof, and a rocking indicating member mounted on said casing and engaged by said arm.

In testimony whereof I have signed my name to this specification in the presence of two subscribing witnesses.

HIPPOLYT SAURER.

Witnesses:
 FRANK DIMUKE,
 EMIL MULE.